United States Patent

Sturdivan

[15] 3,691,288
[45] Sept. 12, 1972

[54] ELECTRICAL POWER OUTLET FOR TRAILER CAMP SITES AND THE LIKE

[72] Inventor: Rex E. Sturdivan, Jackson, Miss.

[73] Assignee: Zinsco Electrical Products, Los Angeles, Calif.

[22] Filed: Dec. 14, 1970

[21] Appl. No.: 97,844

[52] U.S. Cl.................174/38, 174/52 R, 174/59, 317/104, 317/112, 317/120
[51] Int. Cl..........H02b 9/00, H02b 1/04, H02b 1/10
[58] Field of Search........174/38, 45 R, 48, 50, 52 R, 174/59, 60; 317/99, 104–120; D26/5, 5.2

[56] References Cited

UNITED STATES PATENTS

| | | | |
|---|---|---|---|
| D204,269 | 4/1966 | Naudus, Jr. | D26/5.2 |
| 2,916,591 | 12/1959 | Benn | 200/168 D |
| 3,188,379 | 6/1965 | Simon | 174/38 |
| 3,450,951 | 6/1969 | Boyle | 317/105 |
| 3,502,785 | 3/1970 | Nickola | 174/38 |

FOREIGN PATENTS OR APPLICATIONS

| | | | |
|---|---|---|---|
| 554,514 | 7/1943 | Great Britain | 174/48 |
| 147,028 | 9/1954 | Sweden | 174/52 R |

OTHER PUBLICATIONS

Midwest Electric Products, Inc. of Mankato, Minnesota, Catalog No. 69, Feb. 1969, pages 27–29 and 32 relied on.

*Primary Examiner*—Laramie E. Askin
*Attorney*—Harris, Kiech, Russell & Kern

[57] ABSTRACT

A power distribution system for mobile home parks and the like. A hollow post for mounting in the ground and a power panel box mounted thereon and carrying a plug-in meter and a plug-in outlet fitting with interchangeable circuit breakers and receptacles. A power panel box with separated line and load zones and a fully accessible line side cable path.

7 Claims, 7 Drawing Figures

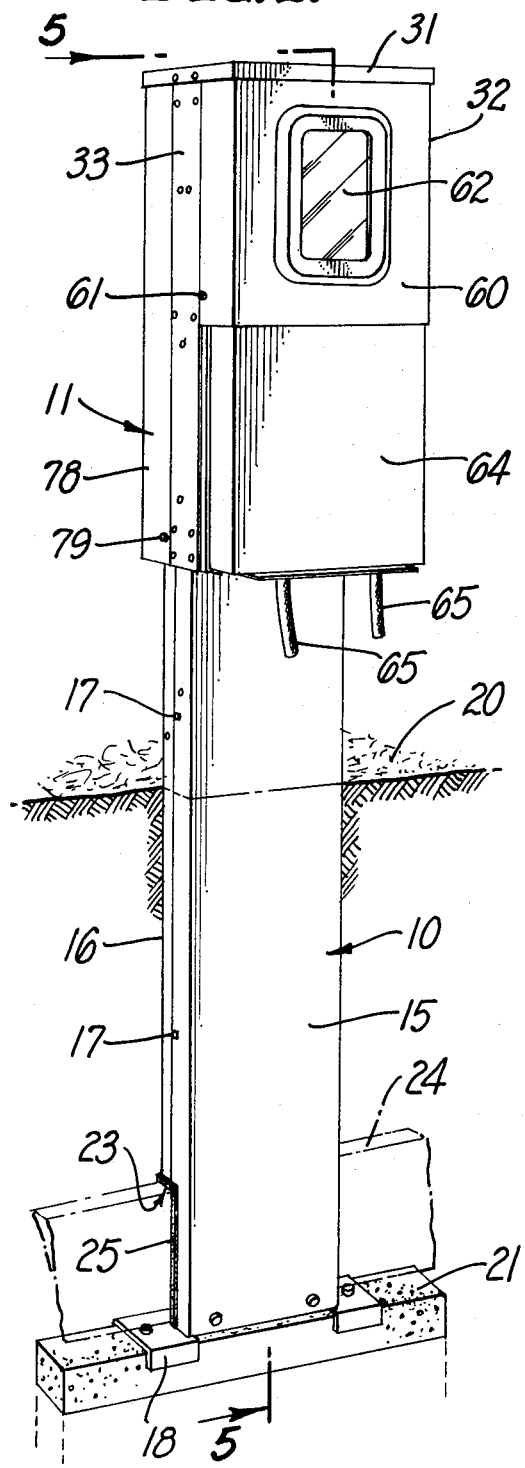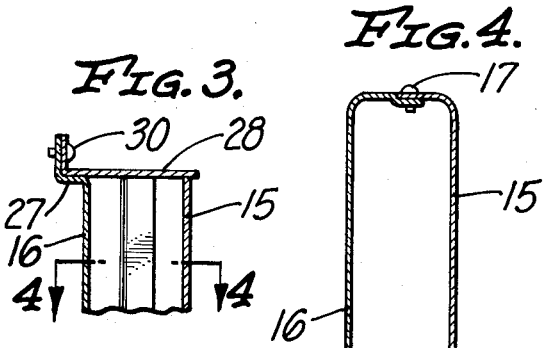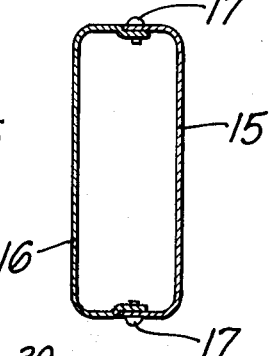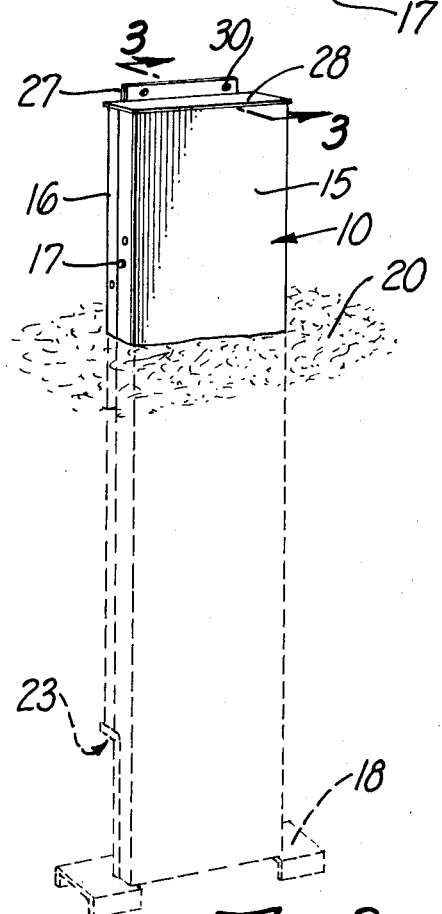
INVENTOR
REX E. STURDIVAN
BY HIS ATTORNEYS
HARRIS, KIECH, RUSSELL & KERN

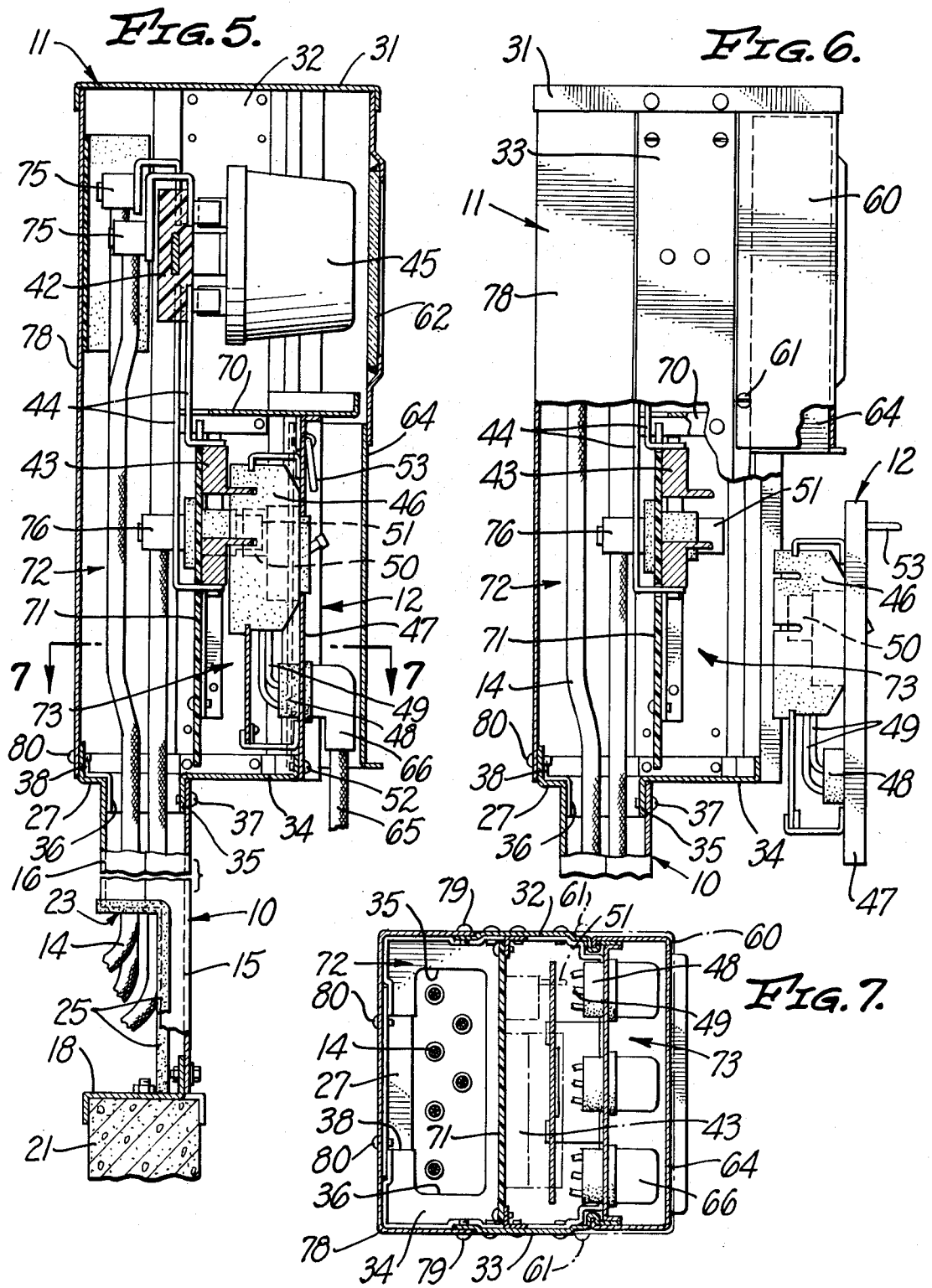

3,691,288

ELECTRICAL POWER OUTLET FOR TRAILER CAMP SITES AND THE LIKE

This invention relates to electric power outlets designed for installation on the ground and particularly suited for use in mobile home parks and trailer camps and the like. The power outlet or distribution unit normally provides for an electric power meter, disconnects and overload protection, typically in the form of circuit breaker switches, and one or more receptacles for plugging in the load cable from the vehicle. A wide variation in load and in plugs and receptacles are encountered, and a separate metering and switching arrangement is desired for each space or stall or vehicle. In the conventional situation, a separate unit is installed at each space with the line side cable running to each unit and with each unit having provision for a meter and for an interchangeable outlet fitting which permits selection of one or more breakers or fuse and switch combinations of various ratings and one or more receptacles of various configurations.

It is an object of the present invention to provide a new and improved distribution system including a support post designed to be buried in the ground and serve as a conduit for the line side cable, and a power panel box for mounting on the post and carrying the electrical components. A further object is to provide such a distribution system incorporating a unique power panel box design providing access to the line side components for ease of cable installation and connection, and a box having separated line and load side access, with the load side being adapted for use with the conventional plug-in style of outlet fitting for ready change of ratings and receptacle styles. An additional object is to provide such a power panel box which can be mounted directly on the hollow support post or on the side of a building or other support structure.

Other objects, advantages, features and results will more fully appear in the course of the following description. The drawings merely show and the description merely describes a preferred embodiment of the present invention which is given by way of illustration or example.

In the drawings:

FIG. 1 is a perspective view of an electrical power outlet installed in the ground and incorporating a preferred embodiment of the present invention;

FIG. 2 is a view similar to that of FIG. 1 showing the mounting post prior to installation of the power panel box;

FIG. 3 is a partial sectional view taken along the line 3—3 of FIG. 2;

FIG. 4 is a sectional view taken along the line 4—4 of FIG. 3;

FIG. 5 is an enlarged sectional view taken along the line 5—5 of FIG. 1;

FIG. 6 is a view similar to that of FIG. 5 showing the outlet fitting removed; and FIG. 7 is a sectional view taken along the line 7—7 of FIG. 5.

The distribution unit of the drawings includes a post 10, a power panel box 11 mounted on the post 10, and an outlet fitting 12 carried in the box 11. The post 10 is a hollow, vertically disposed column which serves as a support for the box 11 and as a conduit for the line side cable 14. Typically the post 10 comprises metal channels 15, 16 joined along their edges by screws 17 to form a hollow box-like structure. A foot 18 may be fixed to the lower end of the channel 15 to provide additional stability. The lower end of the post 10 is buried in the ground 20 and may be mounted on a base 21 of concrete or the like as shown in FIG. 1, or may be installed without any base as shown in FIG. 2. The channel 16 is made shorter than the channel 15 to provide an opening 23 at the lower end of the post. The line side cable may be buried in the ground and enter the post through the opening 23 as seen in FIG. 5. Alternatively, the line side cable may be carried in conduit 24 which engages the post at the opening 23 as shown in FIG. 1. A resilient grommet 25 may be provided around the opening 23 for protection of the cable, if desired.

In one mode of installation, the lower end of the post including the foot 18 is covered with earth leaving a portion of the opening 23 uncovered. The channel 16 is removed and the line cable is laid into the channel 15, after which the channel 16 is again fastened to the channel 15 to close the conduit. More dirt is then dumped around the post to bring the ground to the desired level. This manner of installation permits laying in of the relatively stiff line cable, rather than requiring that it be snaked upward through the interior of the post.

The post 10 has an open top with a flange 27 directed outward and upward (FIG. 3). A cover plate 28 may be affixed to the flange 27 by screws 30 to close the open top of the post until the time for installing the power panel box 11. With this design, the trenching, post installation and line cable laying can be performed during the site preparation. The power panel box and its associated components can be stored in a protected location and can be installed at a later date.

The box 11 is designed to fit on the open top of the post 10 and includes a top 31, sides 32, 33, and a bottom plate 34 which are joined together by screws or rivets or by welding to form a rigid shell. The bottom plate 34 includes a flange 35 which defines an opening 36 in the plate 34, with the flange 35 telescopingly engaging the upper end of the post 10 when the box 11 is installed on the post. The box may be fixed in position by one or more screws 37. A gap 38 (FIG. 7) is provided in the bottom plate 34, this gap being closed by the flange 27 at the upper end of the post.

A meter mount 42 and a bus bar assembly 43 are mounted in the box 11 between the sides 32, 33. The meter mount and bus assembly are interconnected by conductors 44. A watt hour meter 45 may be plugged into the meter mount 42. One or more circuit breaker switches 46 may be installed on the bus bar assembly 43.

In a typical installation, the circuit breaker switches 46 are part of the outlet fitting 12, being mounted on a plate 47 together with one or more receptacles 48, with the switches 46 connected to the receptacles 48 by conductors 49. A neutral connector 50 may be mounted on the plate 47 for engaging a neutral stab 51 of the assembly 43. The outlet fitting 12 is shown in the installed position in FIG. 5, with the breakers 46 engaging the bus of the assembly 43 and with the fitting held in place by screws 52. The outlet fitting 12 may be removed by removing the screws 52 and pulling on the ring 53. Another outlet fitting having a different breaker and/or a different receptacle may be substituted when desired.

A channel-shaped cover 60 is affixed to the sides 32, 33 by screws 61 and covers the meter 45. A meter viewing glass 62 may be carried in the cover 60. Another channel-shaped cover 64 is slidably carried in the cover 60 and may be moved up and down between the position of FIG. 5 covering the switches and receptacles, and the position of FIG. 6 providing access to the switches and receptacles. With the sliding cover 64 in the up position of FIG. 6, outlet fittings 12 may be removed and installed, switches 46 may be turned on and off, and cables 65 with plugs 66 may be inserted into and removed from receptacles 48. The bottom of the box 11 adjacent the sliding cover 64 is open for entry of the cables 65.

A plate 70 is installed between the sides 32, 33 to provide a barrier between the upper zone of the meter 45 and the lower zone of the bus assembly 43.

A plate 71 of insulating material is mounted between the sides 32, 33 defining a line side cable zone 72 and a load zone 73 within the box 11. The bus assembly 43 and the neutral stab 51 may be carried on the plate 71 in the zone 73. The outlet fitting 12 is positioned in the zone 73. The zone 72 provides a path for the line cable 14 which runs up through the post 10, through the opening 36 of the bottom plate 34, and through the zone 72 to lugs 75 on the meter block 42 and a lug 76 on the neutral stab 51. A channel-shaped cover 78 is mounted on the box by screws 79, 80, enclosing the line cable 14 in the zone 72.

When the electrician is ready to install the power panel box 11, the cover plate 28 is removed from the upper end of the post 10 and the cover 78 is removed from the box. The gap 38 in the bottom plate 34 is exposed and the box may be set directly onto the post. The line cable 14 is laid into position, being movable through the gap 38 into engagement with the lugs 75, 76. The cable does not have to be fed in through the bottom of the box. With the cover 78 removed, there is access from three sides to the cable and lugs for ease of installation. In a typical installation, there will be two conductors for each phase and two conductors for the neutral or ground, providing for connection of a plurality of the distribution units in parallel.

After the line cable is installed, the cover 78 is replaced, completely enclosing the line side of the box. While the cover 64 provides access to the load side zone 73, this zone is separated from the line side zone 72 by the plate 71 and is separated from the meter section by the plate 70.

Although an exemplary embodiment of the invention has been disclosed and discussed, it will be understood that other applications of the invention are possible and that the embodiment disclosed may be subjected to various changes, modifications and substitutions without necessarily departing from the spirit of the invention. By way of example, all applications do not require metering and the meter 45 may be omitted if desired. In another alternative installation, the box 11 may be mounted at its side to a wall or other support structure rather than on a post with the line cable entering either through the bottom or through a side of the box.

I claim:

1. In an electric power distribution system for mobile home parks and the like, the combination of:
    a hollow post for mounting in the ground in a generally vertical position, said post having an open top and an outwardly directed first flange at said open top;
    a power panel box mounted on said post at said open top and defining a line side cable path from said hollow post through said open top into said box,
    said box including a bottom plate with a downward second flange projecting into said post in telescoping engagement, with said box resting on said top and first flange; and
    an outlet fitting mounted in said box for connection to a load;
    said box including means for connecting the line side cable to said outlet fitting.

2. A system as defined in claim 1 wherein said box includes a first cover closing the box portion of said line side cable path, with said first cover mounted on said first flange, and wherein said bottom plate has a gap closed by said first flange.

3. A system as defined in claim 2 wherein said post includes a removable side member carrying said first flange whereby said line side cable path is an open channel closed by said side member and first cover.

4. In an electric power distribution system for mobile home parks and the like, the combination of:
    a hollow post for mounting in the ground in a generally vertical position, said post having an open top:
    a power panel box mounted on said post at said open top and defining a line side cable path from said hollow post through said open top into said box; and
    an outlet fitting mounted in said box for connection to a load;
    said box including:
    means for connecting the line side cable to said outlet fitting;
    an insulating plate mounted therein defining a first zone including said line side cable path, and a second zone with said outlet fitting in said second zone;
    a first cover at one side of said box providing access to said first zone; and
    a second cover at the opposite side of said box providing access to said second zone.

5. A system as defined in claim 4 wherein said first cover is channel shaped and encloses three sides of said first zone whereby removal of said first cover provides access to said line side cable path of said first zone from three sides.

6. In an electric power distribution system for mobile home parks and the like, the combination of:
    a power panel box having an insulating plate mounted therein defining a first zone and a second zone, a first cover at one side of said box providing access to said first zone, and a second cover at the opposite side of said box providing access to said second zone; and
    an outlet fitting for connection to a load and mounted in said box in said second zone;
    said first cover being channel-shaped and enclosing three sides of said first zone whereby removal of said first cover provides access for line side cable in said first zone from three sides.

7. A system as defined in claim 6 wherein said box includes a bottom plate with a downward flange for projecting into an open top post in telescoping engagement, with said bottom plate having a gap in the outer edge thereof for receiving line side cable.

* * * * *